Aug. 21, 1951  H. E. CHURCHILL  2,565,203
ROTARY FLUID COUPLING HOUSING AND OIL DRAIN SYSTEM
Filed Nov. 22, 1946  3 Sheets-Sheet 2

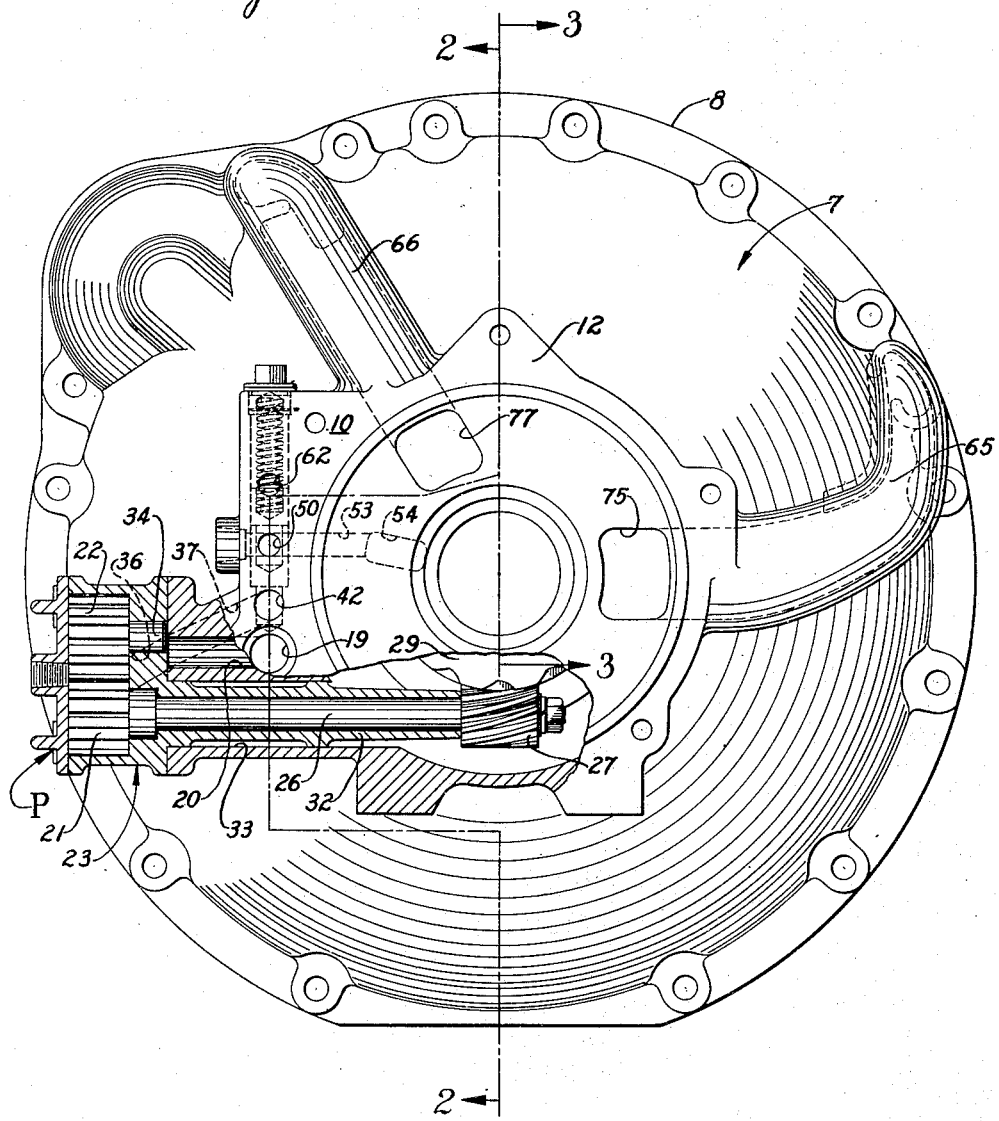

INVENTOR.
Harold E. Churchill
BY
ATTORNEYS

Aug. 21, 1951     H. E. CHURCHILL     2,565,203
ROTARY FLUID COUPLING HOUSING AND OIL DRAIN SYSTEM
Filed Nov. 22, 1946     3 Sheets-Sheet 3
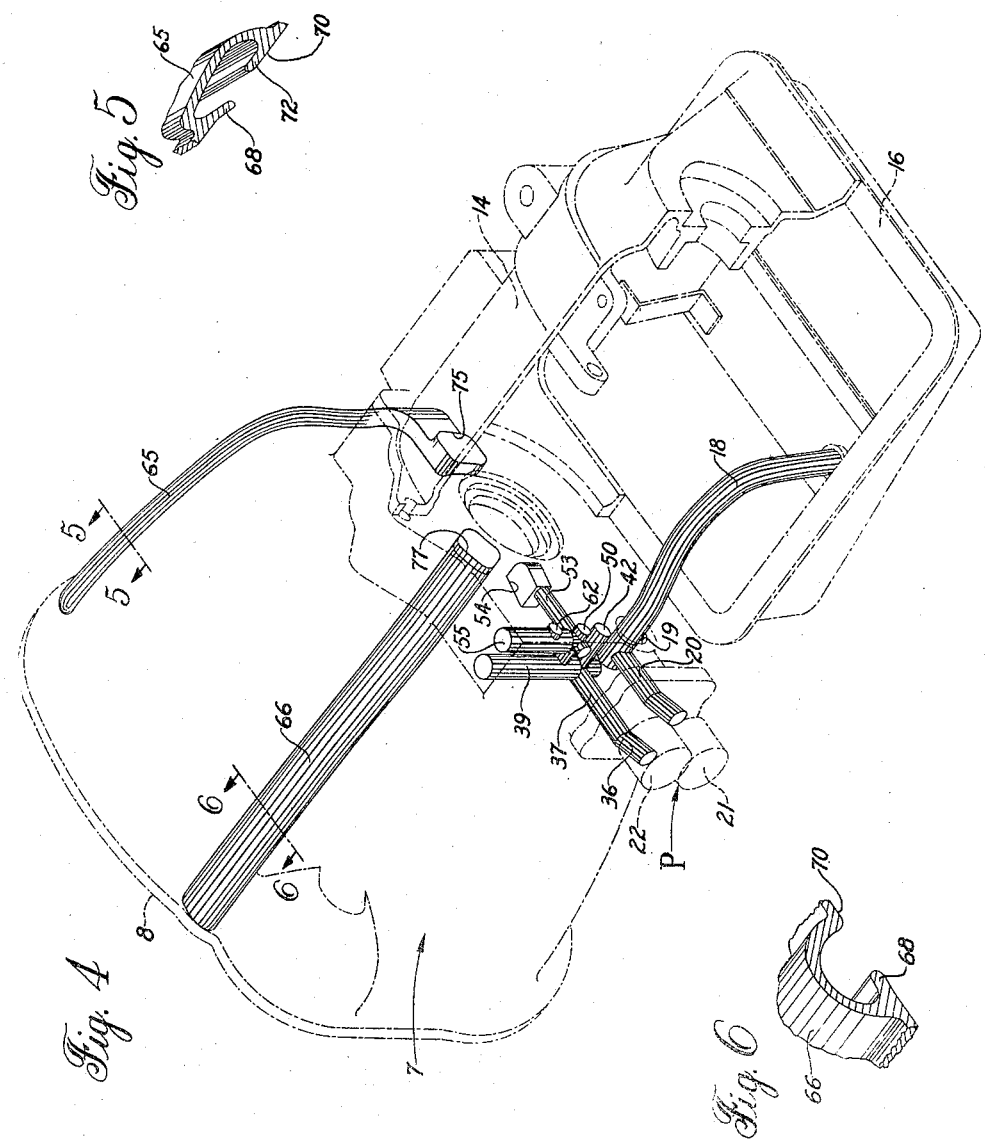
INVENTOR.
BY *Harold E. Churchill*
ATTORNEYS Patented Aug. 21, 1951

2,565,203

UNITED STATES PATENT OFFICE 2,565,203

ROTARY FLUID COUPLING HOUSING AND OIL DRAIN SYSTEM

Harold E. Churchill, South Bend, Ind., assignor to The Studebaker Corporation, South Bend, Ind., a corporation of Delaware Application November 22, 1946, Serial No. 711,777

3 Claims. (Cl. 60—54)

My present invention relates to an improvement in a fluid unit drive housing, and more particularly is concerned with a housing for a torque converter or fluid coupling formed to provide for collecting of oil discharged by centrifugal force by rotation of the converter or coupling and return of the collected oil to a supply sump or reservoir for the fluid drive unit.

So far as I am aware it is the present practice to employ scavenger pumps for returning oil discharged by centrifugal force from a fluid drive unit such as a torque converter or fluid coupling to the sump or reservoir for storing the supply of oil for operation of the fluid unit. The use of scavenger pumps for the purpose last noted perform the desired functions of removing and returning oil discharged from the fluid drive unit but are of primary disadvantage in that they utilize a certain amount of the horse power which might be otherwise transmitted through the fluid drive unit in driving a load on the output shaft of the unit. Further the scavenger pumps, in addition to their initial cost, require servicing and frequently replacement for the satisfactory operation of the drive unit so that such pumps from the standpoint of economy both in cost and time for servicing are undesirable.

It is an object of my invention to provide a fluid unit drive housing formed to provide for collecting and returning oil discharged by centrifugal force in the rotation of the fluid drive unit encased within the housing without requiring a scavenger pump for this purpose.

I propose to achieve the aforesaid object by providing a housing of suitable shape and dimension to receive a fluid drive unit such as a torque converter or fluid coupling with the housing, except for modification to embody my invention, conforming to presently known forms of such housings. These housings are generally cup-shaped and are formed with a peripheral flange at their open ends for attachment to the block of a prime mover such as an internal combustion engine, and with the rear or substantially closed end of the housings being suitably flanged for attachment with a gear transmission housing. In presently known forms of automobile transmissions it has been proposed to employ a torque converter together with a gear box providing two or more gear ratios of drive and it is with this form of transmission that I have chosen to disclose my present invention.

According to my invention I propose to provide a housing of the character above indicated which is formed with one or more troughs integral with the housing, with the trough or troughs opening inwardly of the inner surface of the housing for collecting fluid thrown thereagainst by centrifugal force in rotation of the fluid drive unit disposed within the housing and by means of the trough or troughs conduct the collected fluid outwardly of the housing. In general these troughs are arranged so that they extend generally downwardly from the forward or open end of the housing to the rearward or substantially closed end thereof to provide for flow of the collected oil by gravity rearwardly of the housing. The oil thus collected and delivered rearwardly of the housing may then be discharged into the associated gear box for lubricating the gears of the latter with the returned oil eventually finding its way to the sump of the transmission case. Any conventional form of pump and conduit means may be provided for withdrawing the oil from the case and introducing the same into the converter. Pumps for the latter purpose are now well known in the art with these pumps in some cases being further arranged to provide for delivery of fluid under pressure to a hydraulic control valve means for controlling actuation of the gear means associated with the torque converter.

A preferred feature of one form of trough of the housing of my present invention resides in providing a lip which extends lengthwise of the trough along one edge thereof for a substantial portion of the length of the trough with the outer edge of the lip being adapted to project slightly inwardly of the adjacent portion of the inner surface of the housing which is effective to collect fluid thrown thereagainst by centrifugal force of the fluid drive unit, and with this trough being further provided with a retaining flange extending along the other edge of the trough and toward the lip member to retain the collected fluid in the trough and conduct the same outwardly rearwardly of the housing.

I have found that a primary trough of the character last indicated when disposed generally laterally of the housing to the side thereof which is first approached by any given point on the fluid drive unit after it passes the bottom of the housing serves to collect and return fluid thrown by centrifugal force by rotation of the fluid drive unit to the sump. However, if desired, a secondary trough may be provided disposed posterior of the first trough with respect to the direction of rotation of the fluid drive unit with the secondary trough being formed with a flange along one edge of the trough which serves to collect and convey oil outwardly of the torque converter housing in the operation of the fluid drive unit. The use of the latter secondary trough is desirable in that it is effective in reducing the volume of oil accumulated in the bottom of the housing in the normal operation of the fluid drive unit.

In the preferred form of my invention the primary trough is preferably disposed with its upper end adjacent the open end of the housing with the trough extending rearwardly and generally downwardly lengthwise of the housing and terminating in the opening in the substantially closed end of the housing centrally of the top and bottom thereof. The secondary trough preferably is formed with its upper end disposed forwardly of the upper open end of the housing and extends generally rearwardly and diagonally downwardly with its lower end terminating in an opening in the closed end wall disposed above the horizontal medium plane of the housing and with the upper and lower ends of the secondary trough being disposed laterally oppositely of the vertical medium plane of the housing to that of the upper and lower ends of the primary trough.

The above and other objects, features, and advantages of my invention will appear from the detail description.

Now in order to acquaint those skilled in the art with the manner of constructing and utilizing a fluid drive unit housing in accordance with the principles of my present invention I shall describe in connection with the accompanying drawings a preferred embodiment of my invention.

In the drawings:

Figure 1 is an end elevational view of a fluid drive unit housing constructed in accordance with the principles of my present invention with a portion of the housing being broken away to illustrate in elevation certain parts of a gear pump means supported by the housing;

Figure 4 is a perspective view showing in dotted outline the fluid drive unit housing of Figure 1 and the case or housing of a gear box associated therewith and with the outline of the oil troughs of the fluid drive unit housing and conduits and pump of an oil delivery system being shown in full lines;

Figure 3:
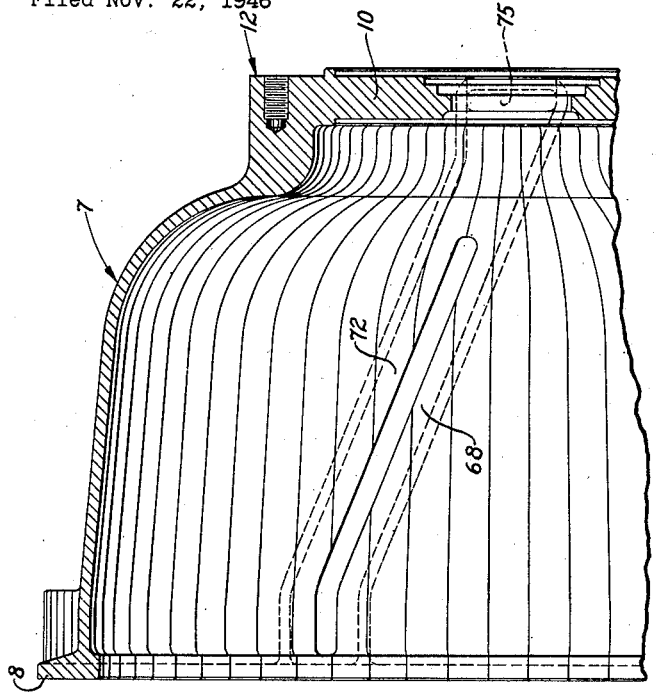
Figure 3 is a detail vertical sectional view taken on line 3—3 of Figure 1 looking in the direction indicated by the arrows.
Figure 2:
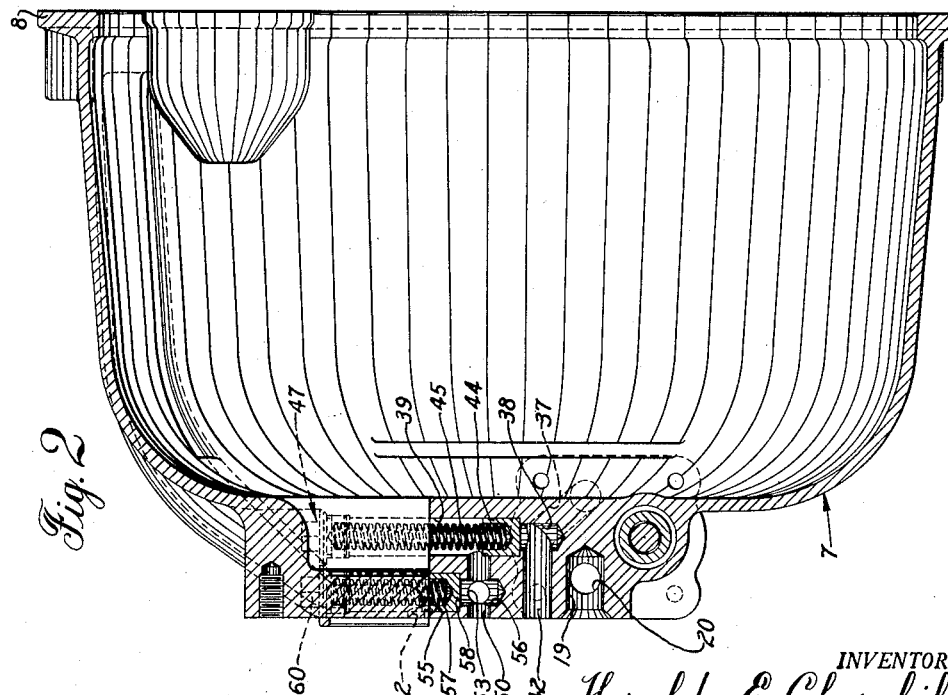
Figure 2 is a detail vertical sectional view taken substantially on line 2—2 of Figure 1 looking in the direction indicated by the arrows.

Figure 5 is a detail transverse sectional view of the primary trough of the housing of Figures 1 and 4 taken substantially on the line 5—5 of Figure 4 looking in the direction indicated by the arrows; and Figure 6 is a detail transverse sectional view of the secondary trough of the housing of Figures 1 and 4 taken substantially on the line 6—6 of Figure 4 looking in the direction indicated by the arrows.

Referring now to the drawings the housing 7 of my invention is of substantially cup-shape and is formed with a peripheral flange 8 at its open front end in a conventional manner for mounting of the housing 7 as by a plurality of bolts to the case or housing of a prime mover such as an internal combustion engine and which housing at its rear or substantially closed end is provided with a laterally disposed integral pump and valve housing portion 10 and a peripheral flange 12 to which the case or housing 14 of a gear box is adapted to be bolted. As is well understood in the art the housing 7 is adapted to have disposed therein a fluid drive unit such as a torque converter or a fluid coupling with the output shaft of the torque converter extending through an opening 15 in the rear or substantially closed end of the housing 7 to have connection with or forming the driven shaft of gear means disposed within the gear case or housing 14. In presently proposed forms of transmissions for automotive vehicles the gear housing or case 14 would be adapted to enclose a two speed forward and reverse gear means and which gear means together with the torque converter form a complete transmission.

As previously noted any known conventional form of pump means may be provided for delivering fluid from a sump or reservoir which in the present instance is shown as being formed by the pan 16 of the gear case or housing 14 to the fluid drive unit enclosed in the housing 7. The pump means generally indicated at P which in addition to the above provides for delivering fluid under pressure to a hydraulic control valve means (not shown) for controlling selection of a desired forward gear ratio or reverse through the gear means enclosed within the gear box or housing 14.

The oil supply circuit including the pump P chosen for purposes of describing my present invention comprises a conduit 18 one end of which is disposed in the pan 16 of the gear box or housing 14 with the other end of the conduit 18 having suitable connection with a pump inlet bore 19 formed in the lower end of portion 10 of the housing 7 and extending lengthwise thereof. The bore 19 intersects a laterally extending bore 20 which as shown in Figure 4 admits fluid to the inlet or low pressure side of the pump from the pan 16 through the conduit and passageways formed by the bores last described. The pump is of conventional form and comprises a pair of meshing gears 21 and 22 encased within a suitable pump housing 23 secured in any appropriate manner to the side face of the portion 10 at the rear end of the housing 7. The gear 21 is fixed to one end of a shaft 26 extending transversely of the rearward end of the housing 7 and which shaft at its other end has a worm 27 suitably secured thereto which has meshing engagement with a worm wheel 29 with the latter having connection with the output shaft of the fluid drive unit adapted to be disposed within the housing 7 to provide drive for the gear pump. As shown the body portion of the gear pump housing is formed with an integral elongated sleeve portion 32 extending through a suitable transversely extending opening 33 at the lower end of the housing portion 10 providing a bearing support for the shaft 26 carrying the pump gear element 21 and the worm 27. The other gear 22 of the gear pump is secured to a shaft 34 journaled in the body portion of the gear pump housing. The outlet or high pressure side of the pump has connection with a passageway comprising interconnected bores 36 and 37 formed respectively in the gear pump housing 23 and the portion 10 of the housing 7 with the bore 37 intersecting a vertically extending counter bore 38 of a vertical bore 39 in the portion 10 of the housing 7. The counter bore 38 has connection with a horizontally and rearwardly extending bore 42 from which a conduit is adapted to extend to a hydraulic control valve means for selectively effecting the actuation of the gear means adapted to be enclosed within the gear box or housing 14. The above described gear pump may for example be capable of developing fluid under pressure in excess of 80 pounds per square inch so that the fluid adapted to be delivered through the passageway 42 to the control box is of the pressure of the order indicated. This manner of delivering fluid under pressure to a hydraulic control valve means is known in the art and forms no part of my present invention.

It will be observed that the aforementioned bore 39 and counter bore 38 at their intersection provide a valve seat for a valve 44 disposed in the vertically extending bore 39. The valve 44 is of the piston type and is normally urged toward seating position by a coil spring 45 having one end thereof seating within a bore formed in the valve 44 and with its other end at the upper end of the bore 39 bearing against a suitable plug and washer means generally indicated at 47 and closing the open upper end of bore 39. For purposes of illustration of my invention let it be assumed that the valve 44 and the spring loading means 45 are of a character for admitting fluid under pressure in excess of the order of 80 pounds per square inch and which fluid preferably should be of the order of 40 pounds per square inch to the lengthwise rearwardly extending bore 50 disposed above the bore 42 extending to the hydraulic control valve means and which bore 50 at its inner end intersects the bore 39. The outer end of the bore 50 is adapted to be blocked off or closed by engagement with an adjacent flat surface of the gear transmission case or housing 14. Intermediate its ends the bore 50 is intersected by a bore 53 extending generally transversely of the rearward end of the housing 7 and which bore 53 has communication with an outlet 54 for discharging fluid under pressure into the fluid drive unit enclosed within the housing 7.

The portion 10 of the housing 7 is formed with a second vertically extending bore 55 with a counter bore 56 extending from the lower end of bore 55 intersecting the bores 50 and 53. The intersection of the counter bore 56 and the bore 55 provide a seat for a valve 58 of the same form as the valve 44 disposed in the bore 55 and is normally urged to seated position by a coil spring 57 having one end disposed in a bore in the valve 58 and confined within the bore 55 by means of the plug and washer assembly 60 at the upper end of the bore 55. A lengthwise rearwardly extending bore 62 at its inner end intersects the bore 55 and as shown opens rearwardly of the portion 10 of the housing above the bore 50. In the event fluid under pressure in the bores 50 and 53 and counter-bore 56 exceeds the predetermined pressure of fluid desired to be admitted to the fluid drive unit through the bore 53 the valve 58 is caused to be urged upwardly against the force of the biasing spring 57 for the valve connecting the discharge bore 62 through the bore 55 with the counter-bore 56 relieving fluid under pressure in excess of that desired for actuation of the fluid drive unit. In certain typical forms of present day torque converters it is desired that the fluid under pressure admitted to the converter be of the order of 40 pounds per square inch and in such instances the valve and spring loading means disposed in the bore 55 may be readily designed to achieve maintaining of this pressure and in the event the pressure build up beyond the valve 44 in the bore 39 becomes excessive the predetermined pressure is maintained by opening of valve 58 and bleeding of fluid through bore 62. The bleed fluid is adapted to be admitted to the gear box or housing 14 whence it returns to the sump.

Fluid under pressure admitted to the fluid drive unit such as a torque converter or fluid coupling through the outlet 54 at the end of the bore or passageway 53 as is known provides for the transmission of torque from a driving element to a driven element through the medium of the fluid in the drive unit. The driving and driven elements of a fluid drive unit as is known in their rotation effect the discharge by centrifugal force of fluid admitted to the unit and any oil collecting in the bottom of the housing is also caused to be picked up and thrown by centrifugal force against the inner surface of the housing. In order to effect the collection of fluid thus caused to be thrown against the inner surface of the housing by centrifugal force I propose to provide primary and secondary oil collecting and discharge troughs 65 and 66, respectively, in the housing 7. The primary trough 65 as viewed in Figure 1 of the drawings is disposed to the right hand side of the vertical median plane of the housing with the secondary trough 66 being disposed to the left hand side of this plane. Also as viewed in the latter figure the fluid drive unit enclosed within housing 7 is adapted to rotate in a counter-clockwise direction so that any given point on the fluid drive unit after leaving the bottom of housing 7 first approaches the primary trough 65 and with the secondary trough 66 in this arrangement being disposed posterior of the primary trough. In the operation of the fluid drive unit oil is caused to be discharged by centrifugal force from the fluid drive unit against the inner surface of the housing 7. In starting up of the converter and during operation thereof oil collects at the bottom of the housing and this oil together with oil discharged from the fluid unit impinges against the adjacent surface of the primary trough 65 wherein it is collected and carried outwardly rearwardly of the housing. Oil discharged by centrifugal force from any given part of the fluid drive unit beyond the primary trough and between the latter and the secondary trough is collected in the latter trough and carried outwardly rearwardly of the housing. Oil discharged posterior of the secondary trough in the direction of rotation of the fluid drive unit finds its way to the bottom of housing 7 where as above pointed out it is picked up by the rotating fluid drive unit and is collected and discharged through the primary trough 65. With this arrangement of primary and secondary troughs the major portion of the oil in the housing is discharged through the primary trough with the secondary trough functioning to effect the removal of oil discharged between the primary and secondary troughs and any carry over of oil from the bottom of the housing carried beyond the primary trough. The primary trough 65 is formed in a rib integral with the housing and as shown more clearly in Figure 5 is provided with a lip portion 68 extending along one edge thereof with the edge of the lip portion projecting slightly inwardly of the inner surface 70 of the housing 7. The lip 68 is effective to collect oil carried up from the bottom of the housing and tending to flow in a counterclockwise direction about the inner surface of the housing and of oil discharged thereagainst by the fluid drive unit in its counterwise rotation. The other edge of the trough has a flange 72 extending lengthwise thereof and serves to retain in the trough fluid collected therein. As will be clear from Figures 1 and 3 it will be observed that the rib cast integrally with the housing 7 forming the primary trough is closed at its upper end with the trough extending generally downwardly lengthwise of the housing from its upper end and terminating in an end opening 75 formed in the rear wall of the housing 7 with the opening 75 being disposed laterally to the same side of the vertical median plane as the upper end of the trough and substantially centrally of the longitudinal horizontal median plane of the housing. The lip portion 68 and the flange 72 of the primary trough meet adjacent the rear end of the housing so that the primary trough is formed with an end duct portion terminating in the opening 75 in the end wall of the housing through which oil collected in the trough is discharged into the gear case or housing 14. In the starting up of the fluid drive unit and in the continued operation thereof the above described construction of the primary trough 65 is effective to collect the bulk of the fluid carried upwardly of the bottom of the housing by the fluid drive unit.

The secondary trough 66 is also formed in a hollow rib cast integral with the housing which rib extends generally downwardly and diagonally inwardly from the front to the rear of the housing with the upper end of the trough being disposed laterally of the vertical median plane of the housing opposite that of the primary trough 65. The lower end of the secondary trough 66 discharges through an opening 77 of the end wall of the housing into the gear case or housing 14. Upon reference to Figure 6 it will be observed that the secondary trough 66 is provided along one edge with a lip portion 78 projecting slightly inwardly of the inner surface of the housing, and which lip portion 78 serves to collect fluid discharged by the fluid drive unit by centrifugal force between the primary trough and the secondary trough, as well as any oil carried by the fluid drive unit beyond the primary trough. The secondary trough 66 for reasons above noted handles a smaller volume of oil than the primary trough 65 so that the provision of a single lip portion 78 is adequate. It will be understood that the discharge outlets 75 and 77 of the primary and secondary troughs 65 and 66, respectively, may be positioned relative to the shafts of the gear mains disposed within the gear case 14 to provide for lubricating of the transmission. When the oil collected by the primary and secondary troughs is so discharged it eventually collects in the sump formed by the pan 16 of the gear case 14 whence it is circulated through the torque converter and the hydraulic valve control means for the transmission by means of the conduit 18 and the pump and circulating system previously described.

While I have shown what I consider to be the preferred embodiment of my invention it will be understood that various modifications and rearrangements may be made therein without departing from the spirit and scope of my invention.

I claim:

1. A hollow substantially cup-shaped open ended housing within which a fluid drive unit including rotatable driving and driven elements is disposed, said housing having a trough opening inwardly of its inner surface and extending generally lengthwise and downwardly from the open end of said housing to an opening in the other end thereof, said trough being defined by a lip portion extending lengthwise along one edge thereof and a flange portion extending towards the lip portion along the other edge thereof, said lip portion being constructed to collect fluid thrown against the inner surface of said housing ahead of said trough by centrifugal force by said fluid drive unit with said flange portion serving to retain the fluid collected by said lip portion in said trough whereby the collected fluid is conducted by the trough outwardly of the opening in said other end of the housing.

2. A hollow substantially cup-shaped open ended housing within which a fluid drive unit including rotatable driving and driven elements is disposed, said housing having a trough opening inwardly of its inner surface, said trough having one end disposed laterally of the vertical median plane of the housing adjacent the upper part of the open end of the latter and extending generally lengthwise and downwardly to an opening in the other end of said housing disposed substantially centrally of the horizontal median plane of the latter and to the same side of the vertical median plane as said one end of said trough, said trough being defined by a lip portion extending lengthwise along one edge thereof and a flange portion extending toward the lip portion along the other edge thereof, said lip portion being constructed to collect fluid in said trough thrown against the inner surface of said housing ahead of said trough by centrifugal force by said fluid drive unit with said flange portion serving to retain the fluid collected by said lip portion in said trough whereby the collected fluid is conducted through the trough outwardly through the opening in said other end of the housing.

3. A hollow substantially cup-shaped open ended housing within which a fluid drive unit including rotatable driving and driven elements is disposed, said housing having primary and secondary troughs opening inwardly of the inner surface of said housing, said primary trough having one end disposed laterally of the vertical median plane of said housing adjacent the upper part of the open end of the latter and extending generally lengthwise and downwardly from said one end to an opening in the other end of the housing disposed substantially centrally of the horizontal median plane of the latter and to the same side of said vertical median plane as said one end, said primary trough being defined by a lip portion extending lengthwise along one edge thereof and a flange portion extending towards said lip portion along the other edge thereof, said lip portion being constructed to collect fluid in said trough thrown against the inner surface of said housing ahead of said trough by centrifugal force by said fluid drive with said flange portion serving to retain the fluid collected by said lip portion in said trough, whereby the collected fluid in said primary trough is conducted through the same outwardly of the opening in said other end of the housing, and said secondary trough having one end disposed laterally of the vertical median plane of the housing opposite said primary trough at the upper part of the open end of the housing and extending generally lengthwise and diagonally downwardly of the latter towards said other end thereof with the other end of said secondary trough opening into said other end of said housing to the same side of said vertical median plane at its said one end and above the horizontal median plane of the housing, said secondary trough having a flange portion extending lengthwise along one edge thereof constructed to collect fluid in said secondary trough thrown against the inner surface of said housing adjacent said secondary trough by centrifugal force by said fluid drive unit whereby the fluid collected in said secondary trough is conducted therethrough outwardly of said other end of the housing.

HAROLD E. CHURCHILL.

REFERENCES CITED

The following references are of record in the file of this patent:

UNITED STATES PATENTS

| Number | Name | Date |
|---|---|---|
| 1,616,252 | Bratvold | Feb. 1, 1927 |
| 1,784,212 | Walker | Dec. 9, 1930 |
| 2,078,738 | Seibold | Apr. 27, 1937 |
| 2,190,830 | Dodge | Feb. 20, 1940 |
| 2,343,786 | Martin | Mar. 7, 1944 |

FOREIGN PATENTS

| Number | Country | Date |
|---|---|---|
| 369,214 | Great Britain | 1932 |